(12) United States Patent
Miller

(10) Patent No.: US 6,590,387 B2
(45) Date of Patent: Jul. 8, 2003

(54) POSITION SENSOR

(75) Inventor: John Michael Miller, Saline, MI (US)

(73) Assignee: Ford Global Technologies L.L.C., Dearborn, MI (US)

( * ) Notice: Subject to any disclaimer, the term of this patent is extended or adjusted under 35 U.S.C. 154(b) by 0 days.

(21) Appl. No.: 09/728,349

(22) Filed: Dec. 1, 2000

(65) Prior Publication Data

US 2002/0067161 A1 Jun. 6, 2002

(51) Int. Cl.$^7$ .................................................. G01B 7/30
(52) U.S. Cl. ............................ 324/207.13; 324/207.24; 324/207.25; 73/597
(58) Field of Search ........................ 324/207.12, 207.13, 324/207.25, 207.24; 73/290 V, 313, 314, 597, 627, 629, 504.01

(56) References Cited

U.S. PATENT DOCUMENTS

| | | | |
|---|---|---|---|
| 3,894,433 A | * 7/1975 | Riester et al. ................. 73/209 |
| 4,071,818 A | * 1/1978 | Krisst ..................... 324/207.13 |
| 4,121,155 A | * 10/1978 | Chamuel ..................... 324/207 |
| 4,144,519 A | * 3/1979 | Chamuel .................... 340/16 R |
| 4,158,964 A | * 6/1979 | McCrea et al. ........... 73/290 V |
| 4,161,665 A | * 7/1979 | Buck et al. .................... 310/26 |
| 4,839,590 A | * 6/1989 | Koski et al. ................. 324/208 |
| 4,994,721 A | 2/1991 | Plotnikov et al. ........... 318/434 |
| 5,094,426 A | 3/1992 | Zajac .......................... 251/14 |
| 5,406,200 A | * 4/1995 | Begin et al. ............. 324/207.12 |
| 5,456,223 A | 10/1995 | Miller et al. .............. 123/90.12 |
| 5,485,760 A | 1/1996 | Lange ....................... 74/89.25 |
| 5,952,823 A | * 9/1999 | Nyce et al. ............. 324/207.13 |
| 6,101,889 A | 8/2000 | Laskey ....................... 74/89.15 |
| 6,426,618 B1 | * 7/2002 | Nyce et al. ................. 324/7.13 |

OTHER PUBLICATIONS

Rassem R. Henry, "A Novel, Fully Flexible, Electro–Mechanical Engine Valve Actuation System", 1997.

* cited by examiner

Primary Examiner—Edward Lefkowitz
Assistant Examiner—Reena Aurora
(74) Attorney, Agent, or Firm—John F. Buckert; Allan J. Lippa

(57) ABSTRACT

A magneto-strictive sensor 82 for determining a position of a valve 70 and/or a rotor 68 of an electromechanical valve assembly 46 is provided. In particular, the magneto-strictive sensor 82 is utilized to determine a rotational position of the rotor 68 and/or an axial position of the valve 70. The sensor 82 includes a sonic conduit 144 extending around a portion of a circumference of the rotor 68 of the valve assembly 46. The sensor 82 further includes a sonic wave generator 150 generating a sonic wave in the conduit 144 responsive to a transmit signal. The sonic wave propagates to a localized stress boundary 156 in the conduit 144 which is induced by a sensor magnet 80 rotating with the rotor 68. The sonic wave is reflected in the conduit 144 from the stress boundary 156. The sensor 82 further includes a sonic wave receiver 152 receiving the reflected sonic wave from the conduit 144 and generating a received signal responsive to the sonic wave. Finally, the sensor 82 includes a sensor controller 146 configured to generate the transmit signal and to receive the received signal. The controller 146 calculates a position value responsive to a round trip travel time of the sonic wave in the conduit 144.

26 Claims, 8 Drawing Sheets

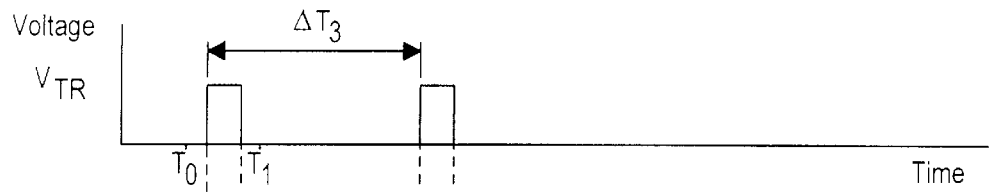
FIG. 9A
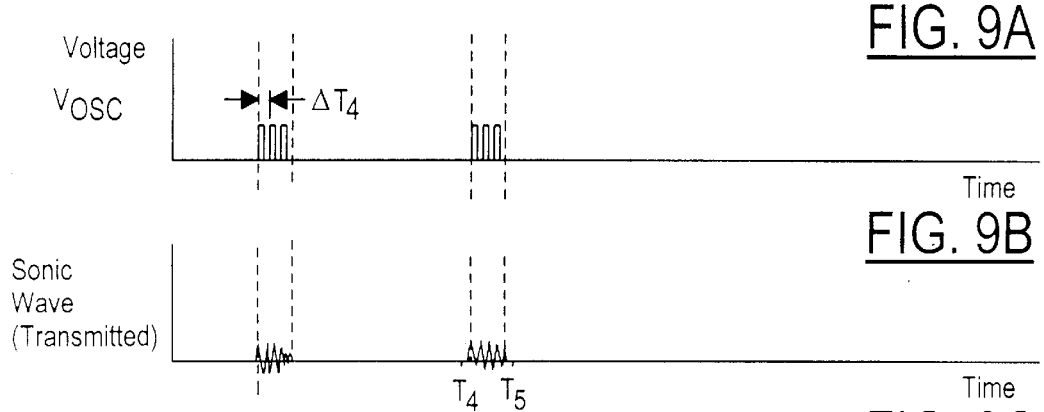
FIG. 9B
FIG. 9C
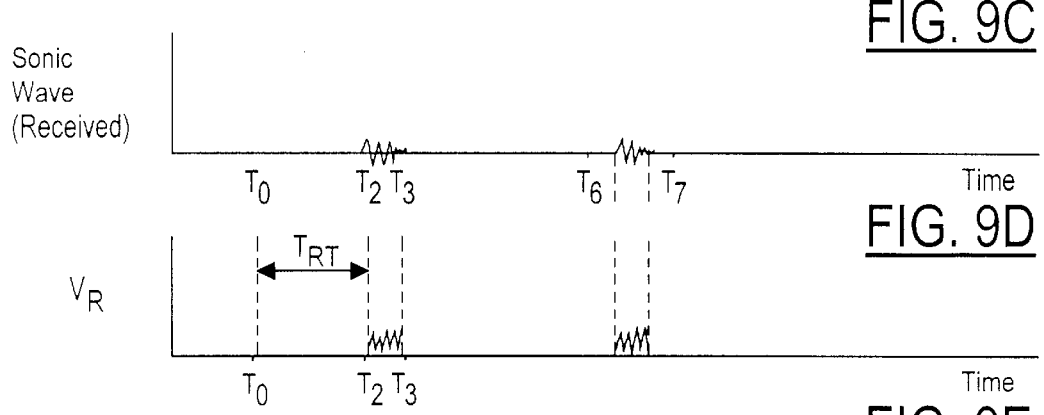
FIG. 9D
FIG. 9E
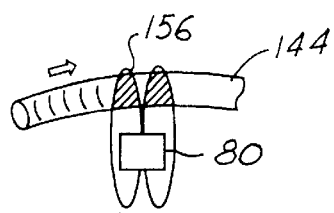
FIG. 10
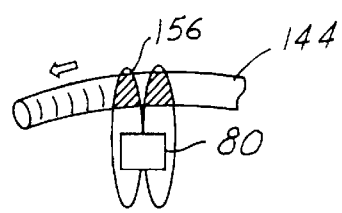
FIG. 11

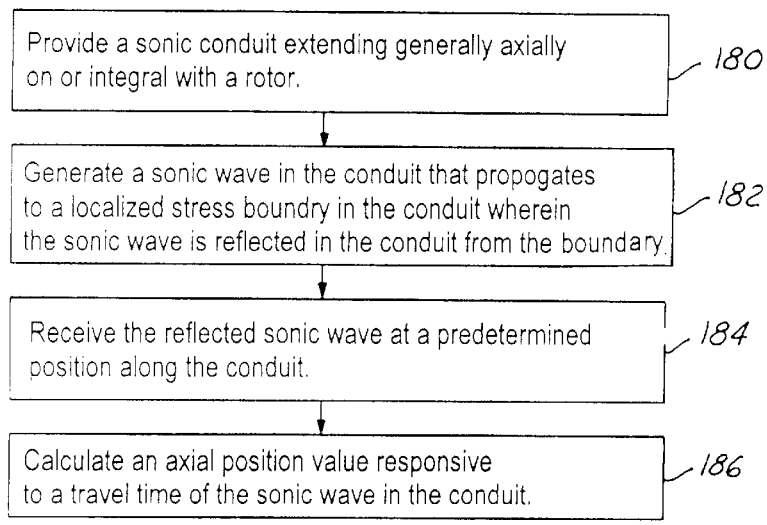
FIG. 14
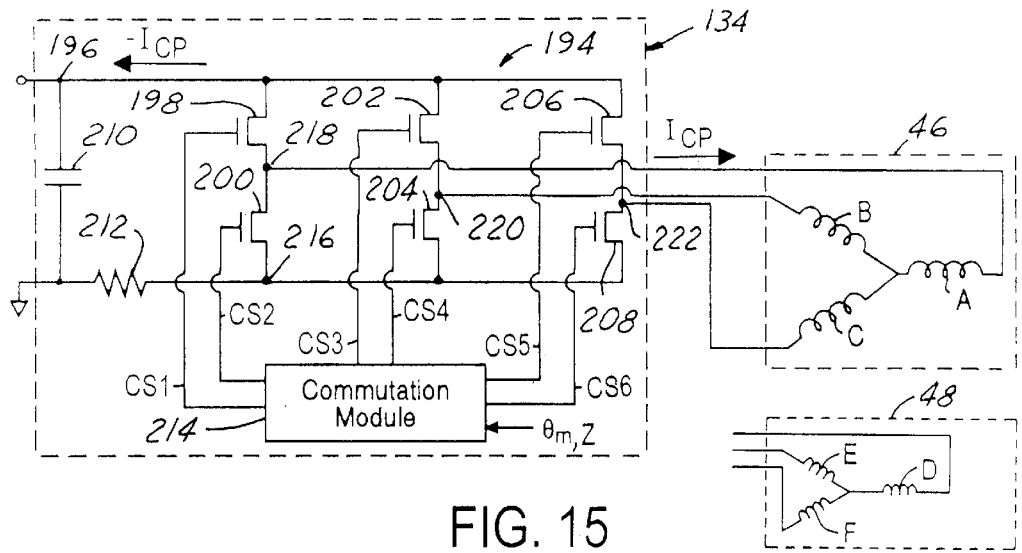
FIG. 15
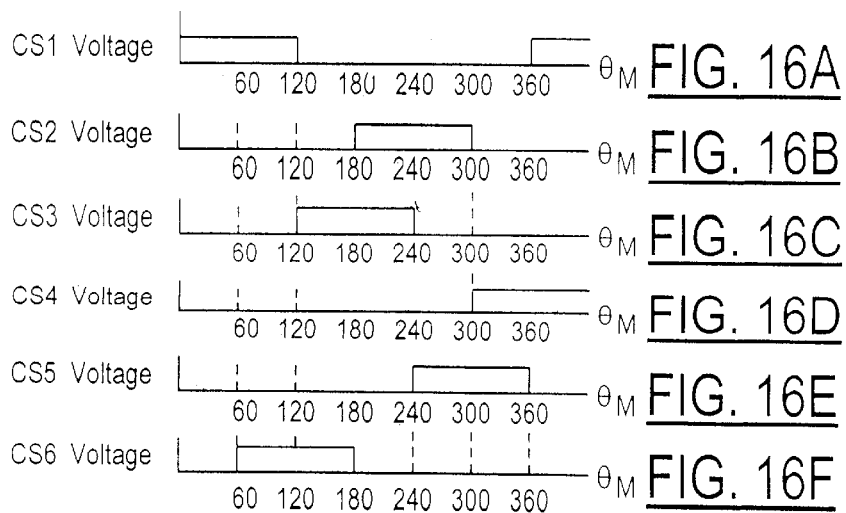
FIG. 16A
FIG. 16B
FIG. 16C
FIG. 16D
FIG. 16E
FIG. 16F

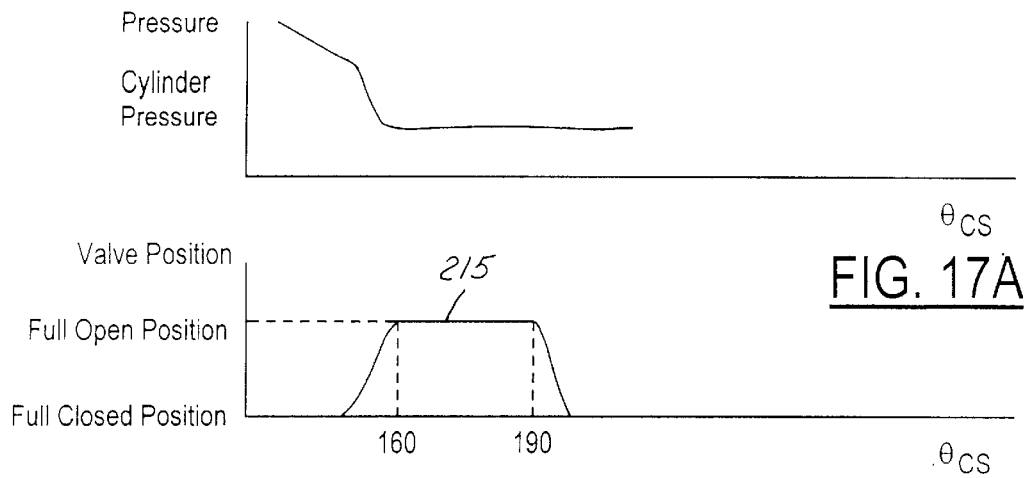
FIG. 17A
FIG. 17B
FIG. 17C
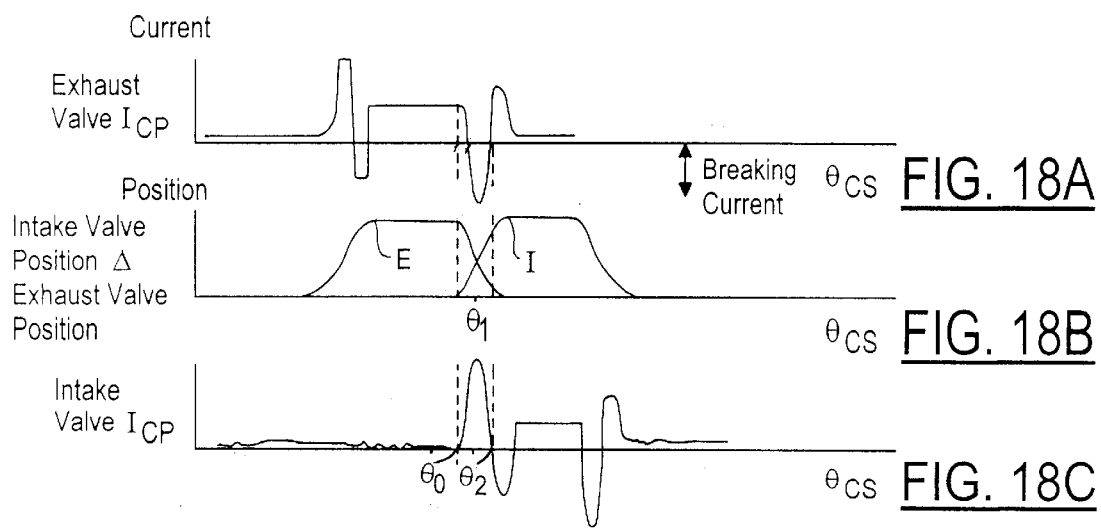
FIG. 18A
FIG. 18B
FIG. 18C

# POSITION SENSOR

FIELD OF THE INVENTION

This invention relates to a position sensor, and particularly, to a magneto-strictive sensor for determining a position of a valve in an internal combustion engine.

BACKGROUND OF THE INVENTION

Automotive manufacturers are currently utilizing camless intake and exhaust valve assemblies to control fluid communication in engine cylinders of internal combustion engines. The camless valve assemblies may utilize hydraulic, pneumatic, or electromechanical means to move a valve.

It is further known that varying an engine valve dwell time (i.e., the time interval a valve is open), a valve dwell position (i.e., the amount the valve is open), a valve opening rate, a valve closing rate, and an initial opening time of a valve (i.e., valve phasing) may be used to increase fuel efficiency and lower emissions. Further, the most flexible valve assemblies may be independently actuated/controlled with respect to other valve assemblies in an engine.

Referring to FIG. 1, a known engine 10 having an engine head 12 and electromechanical valve assemblies 14, 16 is shown. The engine head 12 includes an air intake line 18 and an exhaust line 20. The valve assemblies 14, 16 control communication between the line 18, 20, respectively, with an engine cylinder (not shown).

The valve assembly 14 includes a pair of solenoids 22, 24, and a valve 26. The valve 26 includes a valve stem 28 and a valve head 30. The solenoids 22, 24 are utilized to either open or close the valve 26. In particular, when the solenoid 24 is energized (and solenoid 22 is de-energized), the valve head 30 is moved axially away from a valve seat 32 to allow fluid communication between the intake line 18 and a cylinder (not shown). When the solenoid 22 is energized (and solenoid 24 is de-energized) the valve head 30 engages the valve seat 32 to prevent fluid communication between the intake line 18 and the cylinder. Thus, the known valve assembly 14 has a two-position valve 26 having either a full open state or a full closed state. As such, the valve assembly 14 has several operational disadvantages. In particular, the valve assembly 14 cannot precisely control a valve dwell time duration, a valve dwell position, a valve opening rate, a valve closing rate, valve phasing. Thus, the valve assembly 14 cannot be utilized to effectively increase fuel efficiency and lower emissions in an engine. Further, the valve assembly 14 does not provide for soft seating of the valve head 30 on the valve seat 32 under all operating conditions of the engine 10—including temperature extremes and control strategy variations. As a result, the valve head 30 generates undesirable noise when contacting the valve seat 32.

Another known electromechanical valve assembly (not shown) includes an electric motor, a cam, and a poppet valve. The motor selectively rotates an output shaft that is connected to the cam. The cam converts that rotary motion of the output shaft to an axial motion of the poppet valve. This known valve assembly is capable of controlling a valve dwell time, a valve dwell position, a valve opening rate, and a valve closing rate. However, the known valve assembly suffers from several disadvantages. First, the valve assembly requires a separate cam resulting in increased component and manufacturing costs. Further, the valve assembly requires a relatively large package space since a separate cam is utilized for each poppet valve.

Position sensors have been used to determine an axial position of valves in intake and exhaust valve assemblies. Two commonly used types of position sensors include a Hall Effect sensor and a variable reluctance sensor. Each valve assembly may have a corresponding position sensor disposed on top of the valve assembly. As such, the known position sensors have several disadvantages in an automotive vehicle. In particular, the known position sensors have a relatively thick axial profile. Accordingly, the sensors substantially increase the height of intake and exhaust valve assemblies, resulting in an increased height of a vehicle hood to accommodate the valve assemblies. Those skilled in the art will recognize that a higher vehicle hood results in decreased fuel economy and decreased visual aesthetics of the automotive vehicle.

SUMMARY OF THE INVENTION

The present invention provides a magneto-strictive sensor for determining a position of a valve in an electromechanical valve assembly. The electromechanical valve assembly may comprise an intake or exhaust valve assembly in an internal combustion engine.

The magneto-strictive sensor in accordance with the present invention includes two preferred embodiments. The first preferred embodiment of the magneto-strictive sensor is utilized to determine (i) a rotational position of a rotor of an electromechanical valve assembly and (ii) an axial position of a valve of the valve assembly. The rotor includes a sensor magnet attached to the rotor that rotates with the rotor. Accordingly, a rotational position of the sensor magnet is indicative of a rotational position of the rotor. The magneto-strictive sensor includes a sonic conduit extending around a portion of a circumference of the rotor of the valve assembly. The sensor further includes a sonic wave generator generating a sonic wave in the conduit responsive to a transmit signal. The sonic wave propagates to a localized stress boundary in the conduit which is induced by the sensor magnet. The sonic wave is reflected in the conduit from the stress boundary. The sensor further includes a sonic wave receiver receiving the reflected sonic wave from the conduit and generating a received signal responsive to the sonic wave. Finally, the sensor includes a sensor controller configured to generate the transmit signal and to receive the received signal. The controller calculates a position value responsive to a round trip travel time of the sonic wave in the conduit. As previously discussed, the position value represents (i) a rotational position of the rotor and/or (ii) an axial position of the valve.

The second preferred embodiment of the magneto-strictive sensor is utilized to determine an axial position of a valve in a valve assembly. The rotor includes a permanent ring magnet that is stationary along an axial axis of the valve. The magneto-strictive sensor includes a sonic conduit extending generally axially on or integral with the valve. The sensor further includes a sonic wave generator generating a sonic wave in the conduit responsive to a transmit signal. The sonic wave propagates to a localized stress boundary in the conduit. The stress boundary is induced by the ring magnet and the sonic wave is reflected in the conduit from the boundary. The sensor further includes a sonic wave receiver receiving the reflected sonic wave and generating a received signal responsive to the sonic wave. Finally, the sensor includes a sensor controller configured to generate the transmit signal and to receive the received signal. The controller calculates a position value responsive to a round trip travel time of the sonic wave in said conduit. As previously discussed, the position value represents an axial position value of the valve.

The magneto-strictive sensor in accordance with the present invention represents a significant improvement over conventional position sensors. In particular, the inventive sensor has an extremely thin axial profile as compared with conventional sensors. Accordingly, the inventive sensor may be disposed within a valve enclosure without increasing the height of an intake or exhaust valve assembly. Accordingly, the lower valve assemblies allow for a lower vehicle hood profile that results in increased fuel economy of the automotive vehicle.

These and other features and advantages of this invention will become apparent to one skilled in the art from the following detailed description and the accompanying drawings illustrating features of this invention by way of example.

BRIEF DESCRIPTION OF THE DRAWINGS

FIGS. 9A–9E are signal schematics illustrating signals in the magneto-strictive sensor shown in FIG. 8.

FIG. 10 is a schematic illustrating a sonic wave propagating through a sonic conduit to a stress boundary in the conduit.

FIG. 11 is a schematic illustrating a sonic wave being reflected in a sonic conduit from a stress boundary in the conduit.

FIG. 14 is a flowchart illustrating a method for determining an axial position of an object in accordance with the present invention.

FIG. 15 is a circuit diagram illustrating a commutation circuit for controlling the electromechanical valve assemblies shown in FIGS. 3 and 13.

FIGS. 16A–16F are signal schematics of control signals generated by the commutation circuit shown in FIG. 15.

FIGS. 17A–17C are signal schematics of valve operational parameters during an actuation of an intake valve.

FIGS. 18A–18C are signal schematics illustrating current recirculation in electromechanical valve assemblies in accordance with the present invention.

DETAILED DESCRIPTION OF THE PREFERRED EMBODIMENTS

Figure 1:
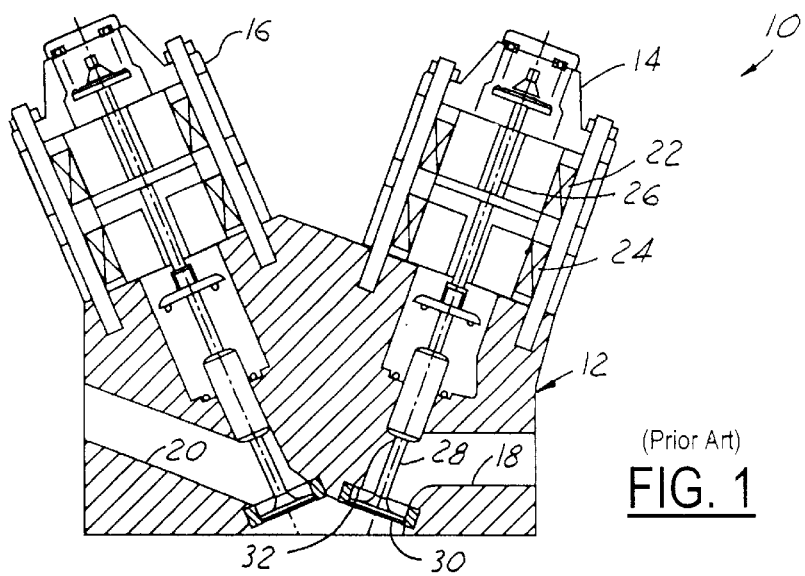
FIG. 1 is a schematic of an engine having two conventional electromechanical valve assemblies.
Figure 2:
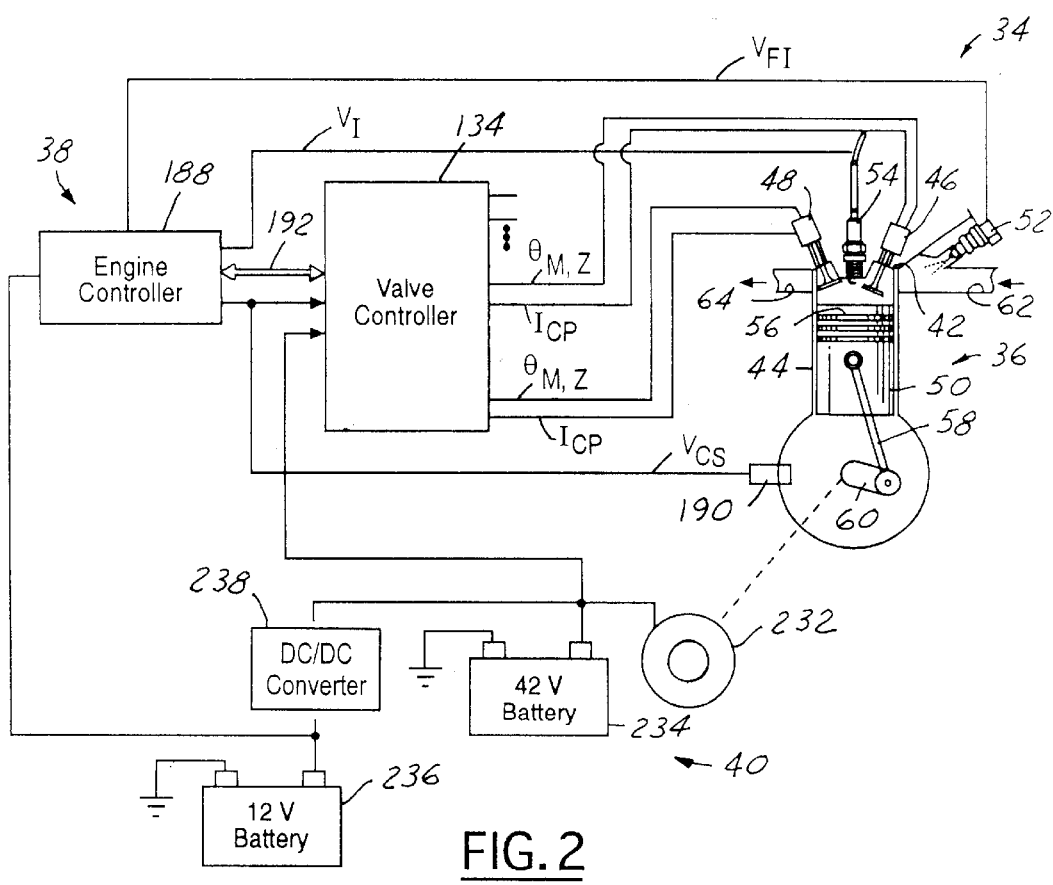
FIG. 2 is a schematic and block diagram of an automotive vehicle having an engine, an engine control system, and a power distribution system in accordance with the present invention.

Referring now to the drawings wherein like reference numerals are used to identify identical components in the various views, FIG. 2 illustrates an automotive vehicle 34 having an engine 36, an engine control system 38, and a power distribution system 40.

The engine 36 comprises an internal combustion engine. The engine 36 includes an engine head 42, an engine block 44, electromechanical valve assemblies 46, 48, a cylinder 50, a fuel injector 52, a spark plug 54, a piston 56, a connecting rod 58, and a crankshaft 60. Even though one cylinder 50 is shown in FIG. 2 for purposes of clarity, the engine 36 includes a plurality of cylinders 50, each cylinder 50 having valve assemblies 46, 48, fuel injector 52, spark plug 54, piston 56, and connecting rod 58.

The engine head 42 is conventional in the art and defines an intake line 62 and a exhaust line 64. The engine head 42 is mounted to the engine block 44 and is configured to hold the valve assemblies 46, 48, the spark plug 54, and the fuel injector 52.

The engine block 44 is conventional in the art and defines each of the cylinders 50. As illustrated, the engine block 44 is configured to receive the engine head 42.

The inventive electromechanical valve assemblies 46, 48 comprise an intake valve assembly and an exhaust valve assembly, respectively. The valve assembly 46 controls fluid communication between the intake line 62 and the cylinder 50. Similarly, the valve assembly 48 controls fluid communication of exhaust gases between the cylinder 50 and the exhaust line 64. Because the valve assemblies 46, 48 are substantially similar—with the only difference being valve assembly 46 having a larger valve face surface than valve assembly 48—only the valve assembly 46 will be described in detail hereinafter.

Before describing the various components of the electromechanical valve assembly 46, the operational advantages of the valve assembly 46 will be discussed. As previously discussed, when operating intake and exhaust valves in an engine, it is advantageous to vary various valve operational parameters to increase fuel efficiency and lower exhaust emissions. Because the valve assembly 46 has a valve 70 that may be selectively moved to commanded incremental axial positions (discussed in greater detail below), the valve assembly 46 provides for the precise control of several valve operational parameters.

Figure 7:
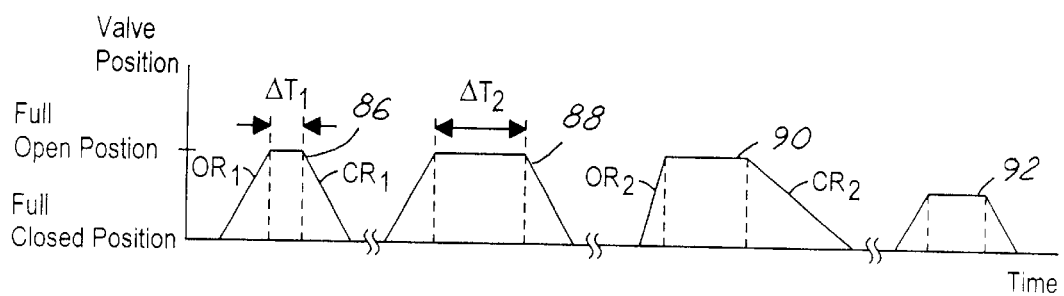
FIG. 7 is a signal schematic illustrating the valve operational parameters for the valve assembly shown in FIG. 3.

Referring to FIG. 7, four valve operational profiles 86, 88, 90, 92 showing the various operational parameters that may be incrementally varied by the valve 70 are shown. As previously discussed, the valve assembly 46 can selectively vary the opening rate of valve 70. For example, profiles 86, 90 illustrate two different possible opening rates $OR_1$ and $OR_2$ for the valve 70. Similarly, the valve assembly 46 can selectively vary the closing rate of the valve 70. For example, profiles 86, 90 illustrate two different possible closing rates $CR_1$ and $CR_2$ for the valve 70. Further, the valve assembly 46 can selectively vary the opening rate of the valve 70 independent of the closing rate of the valve 70, and vice versa, as shown in profile 90. Those skilled in the art will recognize that the torque and inertia of the valve 70 and the rotor 68 limits the valve opening and closing slew rates. In particular, the opening slew rate $OR_{SLEW}$ may be determined by the following equation:

$OR_{SLEW}$=(torque applied to rotor/inertia of rotor and valve)

The assembly 46 may further selectively vary the dwell time of the valve 70. For example, profiles 86, 88 illustrate two possible dwell times $\Delta T_1$ and $\Delta T_2$, respectively, for the valve 70.

The assembly 46 can further move the valve 70 to a desired dwell position other than a full open position as shown in profile 92.

Figure 3:
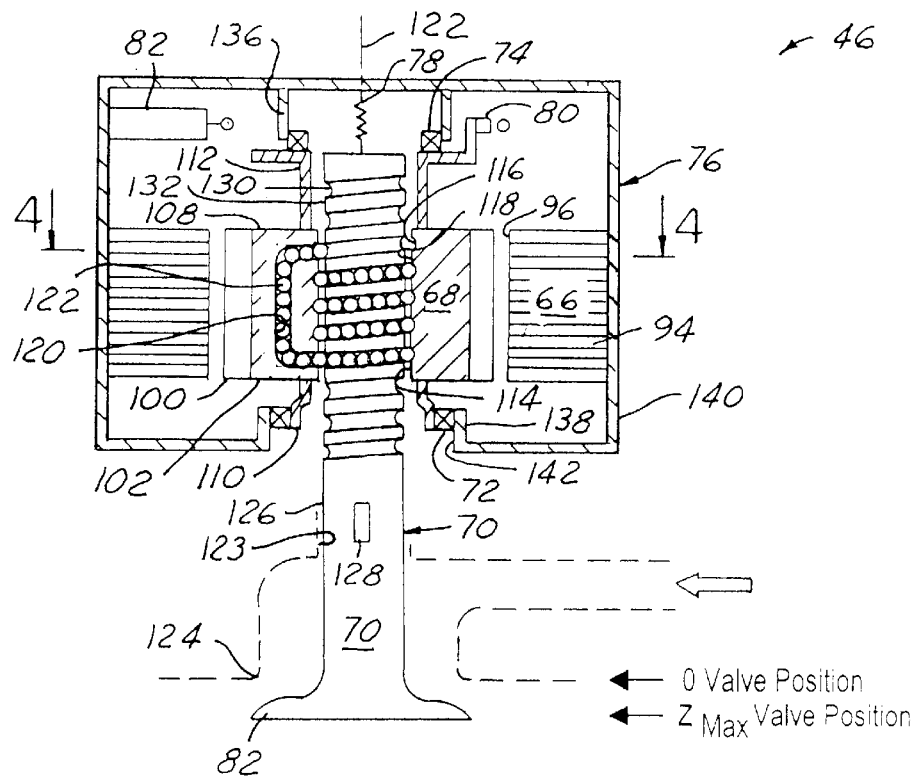
FIG. 3 is a schematic of an electromechanical valve assembly in accordance with a first embodiment of the present invention.

Referring to FIG. 3, the valve assembly 46 includes a stator 66, a rotor 68, a valve 70, bearings 72, 74, an enclosure 76, a centering spring 78, a sensor magnet 80, and a position sensor 82.

The stator 66 is provided to produce a torque to cause rotation of the rotor 68. In the illustrated embodiment, the stator 66 and rotor 68 are configured as a brushless DC motor. However, one skilled in the art will realize that the stator 66 and rotor 68 could be configured as a switch reluctance motor or other motor configurations well known to those skilled in the art. As illustrated, the stator 66 is constructed from a plurality of laminated plates 94 stacked adjacent one another. Further, the stator 66 has a central bore 96 extending axially therethrough configured to receive the rotor 68. The illustrated stator 66 and rotor 68 comprise a three-phase (i.e., phases A, B, C) two-pole, brushless DC motor. Further, the number of slots Q required in the stator 66 may be determined using the following equation:

$Q=q*m*p$, wherein, q=number of slots/pole/phase, m=number of phases, p=number of poles in the stator 66.

Figure 4:
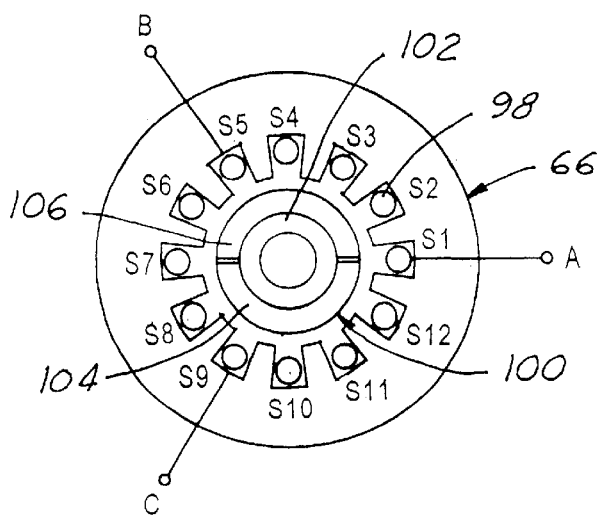
FIG. 4 is a cross-sectional view of the valve assembly shown in FIG. 3.
Figure 5:
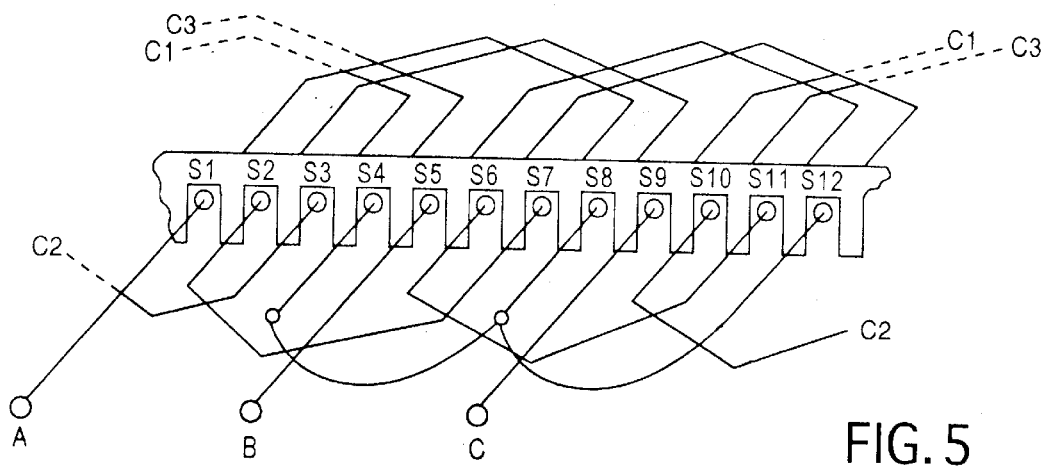
FIG. 5 is an electrical schematic illustrating the coil windings of the valve assembly shown in FIG. 4.

Accordingly, a three-phase, two-pole, brushless DC motor may have twelve slots (Q=2*3*2=12). Referring to FIGS. 4 and 5, the stator windings 98 may be routed in the stator slots S1–S12 to define the phases A, B, C. One skilled in the art will also recognize that the stator 66 and rotor 68 could alternately be constructed as a three-phase, four-pole brushless DC motor. Still further, the stator 66 and rotor 68 could have a higher number of poles if desired.

Referring to FIG. 3, the rotor 68 is provided to drive the valve 70 in a first and a second axial direction. The rotor 68 includes a ring magnet 100 and a ballnut 102.

Referring to FIG. 4, the ring magnet 100 may comprise magnet segments 104, 106, or may alternately comprise a single unitary magnet. In a preferred embodiment, the number of magnet segments of the magnet 100 is equal to the number of poles of the stator 66. Further each magnet segment has a flat inner surface that rests against a corresponding facet defined by an outer surface of the ballnut 102. As illustrated, the ring magnet 100 is fixedly attached around the ballnut 102 and may be glued to the ballnut 102.

Referring to FIG. 3, the ballnut 102 is provided to engage and drive the valve 70. The ballnut 102 is conventional in the art and may be constructed from a plurality of ferromagnetic materials including steel or iron. The ballnut 102 includes a cylindrical body portion 108 and mounting arms 110, 112.

The cylindrical body portion 108 has a central bore 114 configured to receive the valve 70 therein. The body portion 108 has a helical groove 116 separated by a land portion 118. The body portion 108 further includes a return channel 120 for recirculating a train of abutting load ball bearings 122 that travel in the groove portions 116. The return channel 120 may comprise an internal U-shaped channel machined within the body portion 108. The recirculation of the bearings 122 will be discussed in greater detail hereinbelow.

The mounting arms 110, 112 are provided to rotatably support the rotor 68 about an axis 122. The mounting arm 110 is attached to a lower end of the ballnut 102 and is further attached to the bearing 72. The mounting arm 112 is attached to an upper end of the ballnut 102 and is further attached to the bearing 74. Thus, the rotor 68 may rotate in either a clockwise or counter-clockwise direction about the axis 122.

The valve 70 is provided to selectively engage or disengage a valve seat 124. The valve 70 may be constructed from a plurality of materials including, for example, case hardened steel or ceramics such aluminum nitride. The material used for constructing the valve 70 preferably has a relatively low mass so that the valve 70 may be easily accelerated. The valve 70 includes a valve stem 126, a valve head 84, and an anti-twist guide 128.

Figure 6:
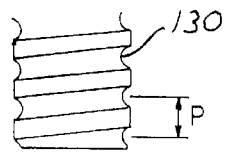
FIG. 6 is a fragmentary view of a valve stem of the valve assembly shown in FIG. 3.

The valve stem 126 has a helical groove 130 that is separated by a land portion 132. The helical groove 130 has the same pitch as the helical groove 116 of the ballnut 102. Accordingly, the helical grooves 116, 130 form a raceway between the rotor 68 and the valve 70. Upon rotation of the rotor 68, the ball bearings 122 travel in the helical grooves 116, 130 and are recirculated in the raceway by the return channel 120. Referring to FIG. 6, the helical groove 130 of the valve stem 126 has a thread or groove pitch P. The relationship between the rotational position $\theta_M$ of the rotor 68 and the axial position of the valve 70 is defined by the following equation:

$\theta_M=(2\pi/P)*Z;$ wherein,

P=pitch of the helical grooves 116, 130,

Z=axial position of the valve 70

In a constructed embodiment, the thread pitch P is set equal to a maximum valve stroke $Z_{MAX}$. Accordingly, one rotation of the rotor 68 results in the valve 70 moving an axial distance equal to the maximum valve stroke $Z_{MAX}$. In alternate embodiments of the valve 70 and the rotor 68, multiple rotations of the rotor 68 may be utilized to move the valve 70 to a maximum valve stroke $Z_{MAX}$. The valve stroke $Z_{MAX}$ is typically 8 mm, although the valve assembly 46 may be configured to have a valve stroke greater than or less than 8 mm.

During installation of the valve 70 in the valve assembly 46 and the engine 36, the valve stem 126 may be inserted through an aperture 123 in the engine head 42. Further, the rotor 68 may have a cylindrical cardboard section (not shown) disposed in the bore 114. The cardboard section is utilized to hold the ball bearings 122 in the return channel 120 prior to attaching the rotor 68 to the valve stem 126. During attachment of the valve stem 126 to the rotor 68, the rotor 68 is threadably received by the valve stem 126, which forces the cardboard section out of the bore 114. Further, the ball bearings 122 travel in the raceway defined by the grooves 116 and 130.

An alternate embodiment of the rotor 68 and the valve 70 may also be utilized. In particular, the body portion 108 of the rotor 68 may include a second helical groove (not shown) extending alongside groove 116. Further, the valve stem 126 of the valve 70 may include a second helical groove (not shown) extending alongside the groove 130. The two additional helical grooves form a second raceway (not shown) for a second set of ball bearings to travel therein. Further, the second set of ball bearings are recirculated in the second raceway via a second return channel (not shown). By utilizing a second set of recirculating ball bearings, the effect of side loading forces on the valve 70 may be reduced.

The spring 78 is provided to center the valve 70 at a predetermined axial position when the engine 36 is shutdown (and the stator 66 is de-energized). This initial reference position may be measured by a position sensor and may be stored by a valve controller 134 for calculating the relative position of the valve 70 with respect to the initial position. As illustrated, the spring 78 is connected between one end of the valve stem 126 and the enclosure 76. Referring to FIG. 3, the spring 78 may be selected to center the valve 70 at any desired initial between the 0 valve position and the $Z_{MAX}$ valve position. For example, each of the springs 78 may be pre-loaded to each valve 70 in a closed position (i.e., 0 valve position)—to minimize a cranking torque of an integrated starter/alternator of the engine 36.

As previously discussed, the valve head 84 is configured to engage the valve seat 124 of the engine 36. As illustrated, the valve head 84 may be integrally connected to the valve stem 126.

The anti-twist guide 128 is provided to prevent rotational movement of the valve 70 about the axis 122. The anti-twist guide 128 may comprise a radially extending engagement portion connected to the valve stem 126 that engages a slot or keyway (not shown) in the engine head 42. Preventing rotation of the valve 70 provides several advantages. First, the valve 70 will less likely deteriorate the valve seat 124 if the valve 70 does not rotate while engaging the valve seat 124. Second, the axial position of the valve 70 may be accurately determined if the valve 70 does not rotate relative to the rotation of the rotor 68.

The bearings 72, 74 are provided to allow rotation of rotor 68 relative to the stator 66 and are conventional in the art. As illustrated, the bearing 74 is connected between a mounting arm 112 of the rotor 68 and an upper mounting arm 136 of the enclosure 76. Similarly, the bearing 72 is connected between the mounting arm 110 of the rotor 68 and a lower mounting arm 138 of the enclosure 76.

The enclosure 76 is provided to enclose and protect the stator 66, the rotor 68, and portions of the valve 70. Further, the enclosure 76 is mounted to the engine head 42. The enclosure 76 includes an outer wall 140, an upper mounting arm 136, and a lower mounting arm 138. The outer wall 140 defines a bore 142 for the valve stem 126 to extend therethrough.

The sensor magnet 80 is provided to indicate the rotational position of the rotor 68. As illustrated, the magnet 80 may be connected to a mounting arm 112 of the rotor 68.

Figure 8:
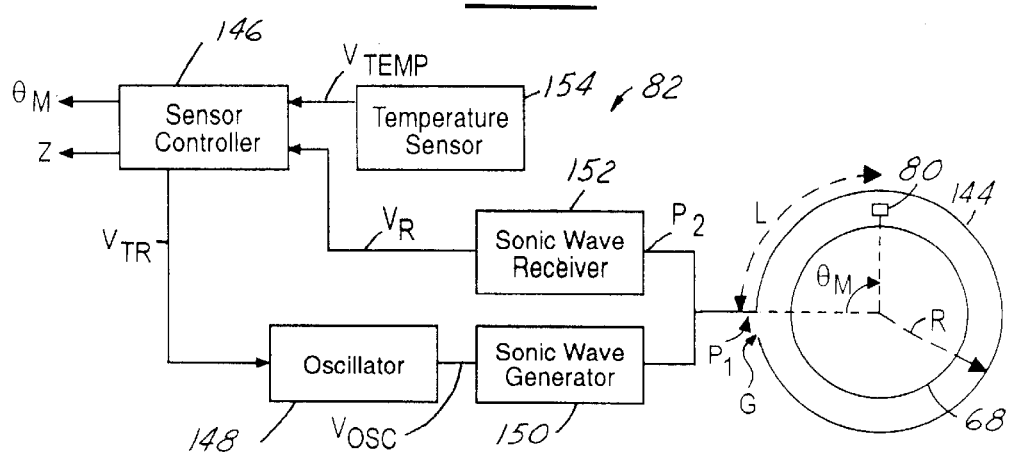
FIG. 8 is a schematic and block diagram of a magneto-strictive sensor in accordance with the present invention.

The position sensor 82 is provided to determine the rotational position $\theta_M$ of the rotor 68 and an axial position Z of the valve 70 in accordance with the present invention. The position sensor 82 may comprise a magneto-strictive sensor that has a relatively small package space as compared with conventional position sensors. Referring to FIG. 8, the magneto-strictive sensor 82 includes a sonic conduit 144, a sensor controller 146, an oscillator 148, a sonic wave generator 150, a sonic wave receiver 152, and a temperature sensor 154.

The sensor controller 146 is provided to calculate a rotational position $\theta_M$ of the rotor 68 and an axial position Z of the valve 70. The controller 146 may comprise either discrete circuits or a programmable microcontroller. As illustrated, the sensor controller 146 is electrically connected to the oscillator 148, the sonic wave receiver 152, and the temperature sensor 154. The sensor controller 146 is configured to generate a transmit signal $V_{TR}$ at a predetermined frequency that is transmitted to the oscillator 148. In a constructed embodiment, the transmit signal $V_{TR}$ is transmitted at a frequency of 100 Khz. The sensor controller 146 receives the temperature signal $V_{TEMP}$, the received signal $V_R$, (explained in detail hereinafter) and the oscillator signal $V_{OSC}$ (explained in detail hereinafter), and calculates the rotational position $\theta_M$ of the rotor 68 and an axial position Z of the valve 70.

The oscillator 148 is provided to generate an oscillator signal $V_{OSC}$ responsive to the transmit signal $V_{TR}$. The oscillator 148 may comprise a conventional voltage controlled oscillator or discrete circuits. As illustrated, the oscillator 148 is electrically connected in series between the sensor controller 146 and the sonic wave generator 150. Referring to FIGS. 9A and 9B, the oscillator 148 receives a transmit signal $V_{TR}$ at a high logic level and generates an oscillator signal $V_{OSC}$ at a 1 Mhz frequency responsive thereto. Those skilled in the art will recognize that the frequency of the transmit signal $V_{TR}$ and the oscillator signal $V_{OSC}$ may be greater than or less than 100 Khz or 1 Mhz, respectively, depending upon the desired accuracy of the calculated rotational position $\theta_M$ and the axial position Z. The frequency of the oscillator signal $V_{OSC}$ (frequency of $V_{OSC}=(1/\Delta T_4)$) is preferably ten times greater than the frequency of the transmit signal $V_{TR}$ (frequency of $V_{TR}=(1/\Delta T_3)$). Further, the frequency of the transmit signal $V_{TR}$ is preferably greater than twice the round trip travel time $T_{RT}$ (explained in greater detail below) of the sonic wave.

The sonic wave generator 150 is provided to generate a sonic wave in the sonic conduit 144. The sonic wave generator 150 may comprise a conventional piezoelectric transducer and is electrically connected to the oscillator 148 and is further bonded to the sonic conduit 144. The generator 150 receives the oscillator $V_{OSC}$ and generates a sonic wave (i.e., sound wave) in the conduit 144 responsive to the oscillator signal $V_{OSC}$.

The sonic conduit 144 is provided to propagate a sonic wave in the conduit 144 around a portion of a circumference of the rotor 68. The sonic conduit 144 may comprise a metal wire or a metal strip that extends around a substantial portion of the circumference of the rotor 68 proximate to the rotor 68. The conduit 144 may be constructed from a plurality of metals, including for example, a nickel-iron alloy. In a constructed embodiment, the conduit 144 is constructed of 18 gauge wire. Referring to FIGS. 8 and 10, the sensor magnet 80 disposed on the rotor 68 induces a localized stress boundary 156 on the conduit 144 proximate to the magnet 80. In particular, the magnet 80 deforms the conduit 144. Accordingly, the magnet 80 and the boundary 156 are indicative of the position of the rotor 68. Accordingly, a sonic wave traveling in the conduit 144 in a first direction to the stress boundary 156, will be reflected from the boundary 156 in a second direction (opposite the first direction). The gap G in the conduit 144 ensures that each the sonic wave initially propagates in only one direction (i.e., clockwise in FIG. 8) around the conduit 144 to the boundary 156.

Referring to FIG. 8, the sonic wave receiver 152 is provided to generate a received signal $V_R$ upon receipt of a sonic wave. The sonic wave receiver 152 may comprise a conventional piezoelectric transducer and is electrically connected to the sensor controller 146 and is further connected to the conduit 144. Referring to FIGS. 9D and 9E, at time interval $T_2$–$T_3$, the receiver 152 receives the sonic wave and generates the received signal $V_R$ responsive thereto.

The temperature sensor 154 generates a temperature signal $V_{TEMP}$ indicative of the ambient air temperature around the sonic conduit 144 and valve assembly 46. The temperature sensor 154 is conventional in the art and is electrically connected to the sensor controller 146.

Figure 12:
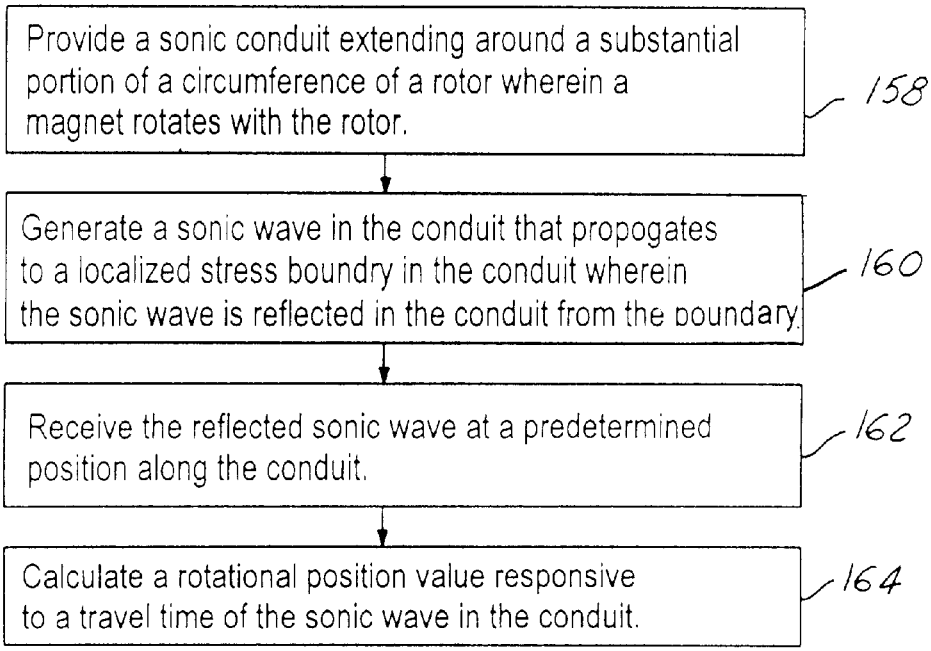
FIG. 12 is a flow chart illustrating a method for determining a rotational position of an object in accordance with the present invention.

Referring to FIG. 12, a method for determining a rotational position of the rotor 68 (i.e., object) utilizing the inventive position sensor 82 will be described. The method includes a step 158 of providing a sonic conduit 144 extending around a substantial portion of a circumference of the rotor 68.

The method further includes a step 160 of generating a sonic wave in the conduit 144 that propagates to a localized stress boundary 156 in the conduit 144 wherein the sonic wave is reflected in the conduit 144 from the boundary 156. Referring to FIGS. 9A, 9B, and 9C, the sensor controller 146 between the time interval $T_0$–$T_1$, generates a transmit signal $V_{TR}$ at high logic level that causes the oscillator 148 to generate oscillator signals $V_{OSC}$. The oscillator signals $V_{OSC}$ cause the sonic wave generator 150 to generate a sonic wave (i.e., vibration) in the conduit 144. The sonic wave propagates in a first direction to the stress boundary 156 and is reflected from the stress boundary 156 in a second direction (opposite the first direction) back toward a sonic wave receiver 152.

Referring to FIG. 12, the method further includes a step 162 of receiving the reflected sonic wave at a predetermined position along the sonic conduit 144. Referring to FIGS. 9D and 9E, during time interval $T_2$–$T_3$, the sonic wave is received by the sonic wave receiver 152. In response, the receiver 152 generates the received signal $V_R$ that is transmitted to the sensor controller 146.

Referring again to FIG. 12, the method further includes a step 164 of calculating a rotational position value $\theta_M$ of the rotor 68 and an axial position Z of the valve 70 responsive to the round trip travel time $T_{RT}$ of the sonic wave in the conduit 144. The equations used by the sensor controller 146 to calculate the rotational position $\theta_M$ of the rotor 68 and the axial position Z of the valve will now be explained. Referring to FIG. 8, the path length L may be determined utilizing the following equation:

$$L=(R^*\theta_M)=(VEL(T)^*T_{RT}/2);$$

wherein,

R=known radius of the sonic conduit 144, $\theta_M$=angular position of the sensor magnet 80, VEL(T)=velocity of the sonic wave in the sonic conduit 144 as a function of the temperature T, $T_{RT}$=round trip travel time of the sonic wave.

For purposes of illustration and simplicity, the conduit length from point P1 to point P2 is assumed to be zero. Accordingly, the rotational position $\theta_M$ of the rotor 68 may be calculated using the following equation:

$$\theta_M=(VEL(T)/2R)^*T_{RT}$$

Further, when the rotational position $\theta_M$ of the rotor 68 is known, the axial position Z of the valve 70 may be calculated using the following equation:

$$Z=\theta_M^*P/2\pi;$$

wherein,

P=pitch of the grooves 130 in the valve stem 126.

As noted above, the velocity of the sonic wave is dependent on the temperature of the conduit 144. In particular, the following equation may be utilized to calculate the velocity sonic wave velocity:

$$VEL(T)=VEL_0[1+\alpha(T-T_0)];$$

wherein, $VEL_0$=velocity of sonic wave at temperature T=20° C., $\alpha$=temperature coefficient of sonic conduit material, $T_0$=20° C.

T=measured temperature of the conduit utilizing temperature sensor 154.

The foregoing equation for calculating VEL(T) represents a truncated Fourier expansion of non-linear velocity versus temperature relationship.

Figure 13:
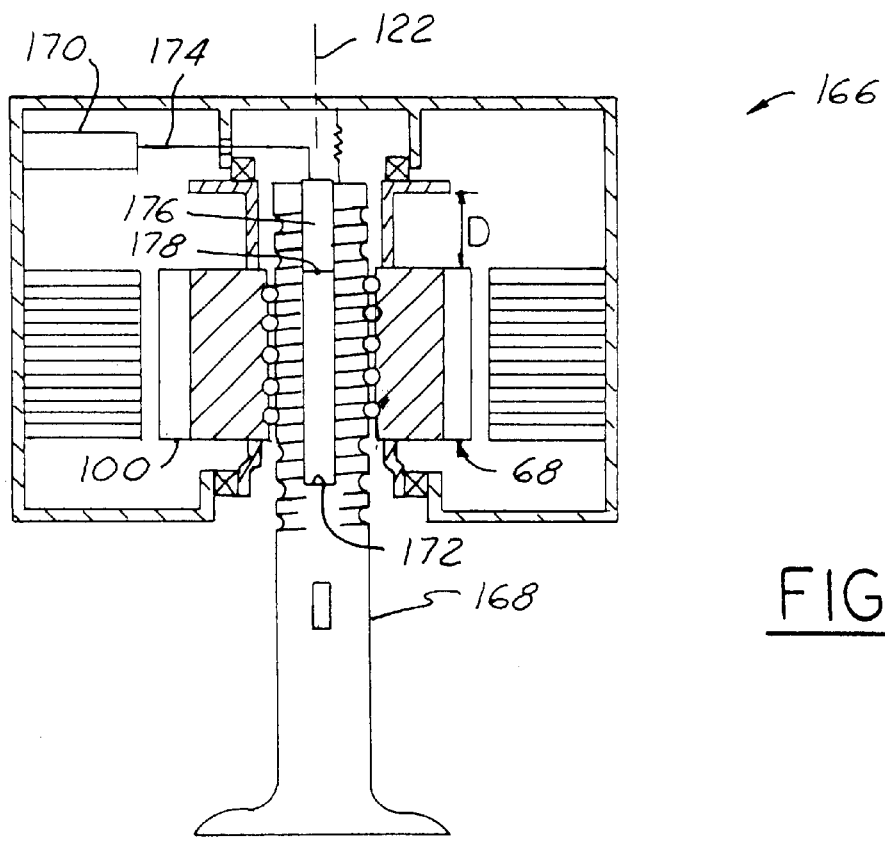
FIG. 13 is a schematic of an electromechanical valve assembly in accordance with a second embodiment of the present invention.

Referring to FIG. 13, an electromechanical valve assembly 166 is provided that is a second embodiment of the valve 46. The valve assembly 166 is substantially the same as the valve assembly 46, except that the sensor magnet 80 has been removed and a valve 168 and a position sensor 170 are used instead of valve 70 and position sensor 82, respectively.

The valve 168 is substantially the same as the valve 70 except that a valve 168 has a bore 172 extending axially into the valve 168.

The position sensor 170 is provided to calculate an axial position Z of the valve 168. The position sensor 170 is substantially the same as the position sensor 82 and includes the sensor controller 146, the oscillator 148, the sonic wave generator 150, the sonic wave receiver 152, and the temperature sensor 154. However, the position sensor 170 utilizes a flexible lead wire 174 and a sonic conduit 176 instead of the sonic conduit 144. As illustrated, the sonic conduit 176 may comprise a longitudinally extending metal wire or a metal bar that is disposed in the bore 172 of the valve 168. The conduit 176 may be constructed from a plurality of metals, including for example, a nickel-iron alloy. Further, the ring magnet 100 of the rotor 68 induces a localized stress boundary 178 in the conduit 176.

The axial distance D from a first end of the conduit 176 to the stress boundary 178 is indicative of the axial position of the valve 168. In particular, the distance D (and the round trip travel time $T_{RT}$ of a sonic wave) will increase as valve 168 incrementally moves in a first axial direction (downward in FIG. 13). Similarly, the distance D (and the round trip travel time $T_{RT}$ of the sonic wave) will decrease as the valve 168 moves in a second axial direction (upward in FIG. 13) opposite the first axial direction. Accordingly, the sensor controller 146 may calculate the axial position Z of the valve 168 utilizing the following equation:

$$Z=D=(VEL(T)^*T_{RT}/2).$$

For purposes of illustration and simplicity, the length of the lead wire 174 is assumed to be equal to a zero length.

Referring to FIG. 14, a method for determining an axial position of a valve 168 utilizing the position sensor 170, will be described. The method includes a step 180 of providing a sonic conduit 176 extending generally axially on or integral with the valve 168. The method further includes a step 182 of generating a sonic wave in the conduit 176 that propagates to a localized stress boundary 178 wherein the wave is reflected from the boundary 178. The method further includes a step 184 of receiving the reflected sonic wave at a predetermined position along the conduit 176. Finally, the method includes a step 186 of calculating an axial position Z of the valve 168 responsive to the travel time of the sonic wave in the conduit 176.

Referring to FIG. 2, the remaining elements of the engine 36 will be described. As previously discussed, the engine 36 includes the fuel injector 52. The fuel injector 52 selectively provides fuel to one or more cylinders 50 and is conventional in the art. In particular, each fuel injector 52 delivers a predetermined amount of fuel into one or more cylinders 50 responsive to a fuel injector control signal $V_{FI}$ generated by an engine controller 188.

The spark plug 54 is provided to ignite the fuel in the cylinder 50 responsive to an ignition control signal $V_I$ generated by the engine controller 188. When the fuel is ignited in the cylinder 50, the piston 56 drives the crankshaft 60 via the connecting rod 58.

Referring again to FIG. 2, the engine control system 38 is provided to control the operation of the engine 36 in accordance with the present invention. The engine control system 38 includes a valve controller 134, an engine controller 188, a crankshaft position sensor 190, and the valve position sensor 82.

The valve controller 134 is a bi-directional controller that can control the incremental movement of valves in both axial directions. For purposes of discussion it will be assumed that each of the valve assemblies 46, 48 includes a valve 70 and a position sensor 82. As illustrated, the valve controller 134 receives a rotational position value $\theta_M$ and an axial position value Z from the position sensor 82, and a crankshaft position signal $V_{CS}$ from the crankshaft position sensor 190. Further, the valve controller 134 receives operational parameters from the engine controller 188 for each valve 70 via a communication bus 192. The communication bus may comprise a CAN (i.e., controller area network) bus operating at a bus speed of 1 megabit/second. The valve operational parameters include a valve dwell time, a valve opening rate, a valve closing rate, and valve phasing information. In response to the foregoing signals and parameters for each valve 70, the valve controller 134 generates a commanded valve position current $I_{CP}$—for each valve assembly 46, 48—to selectively control the axial position of each valve 70.

Referring to FIG. 15, a more detailed schematic of the valve controller 134 is illustrated. In particular, the valve controller 134 contains a conventional commutation circuit 194 for each valve assembly 46, 48 in the engine 36. For example, when engine 36 has four-cylinders and eight valve assemblies (four intake valve assemblies 46 and four exhaust valve assemblies 48), the valve controller 134 would have eight commutation circuits 194 to control the eight valve assemblies. Each of the circuits 194 would be connected between a node 196 (connected to a positive terminal of the battery 234) and system ground. Each commutation circuit 194 includes switches 198, 200, 202, 204, 206, 208, a capacitor 210, a resistor 212, and a commutation module 214.

Switches 198, 200, 202, 204, 206, 208 are provided to selectively energize the phases A, B, C of the stator 66. Switches 198, 200, 202, 204, 206, 208 are conventional in the art and may comprise either MOSFET transistors, IGBT transistors in either planar or trench structure, or bipolar transistors. Switches 198, 200 are connected in series between nodes 196, 216 and have an intermediate node 218 connected to phase A. Similarly, switches 202, 204 are connected in series between nodes 196, 216 and have an intermediate node 220 connected to phase B. Further, switches 206, 208 are connected in series between nodes 196, 216 and have an intermediate node 222 connected to phase C.

The capacitor 210 is provided to ground transient voltage spikes which could damage the switches 198, 200, 202, 204, 206, 208. As illustrated, the capacitor 210 is connected between the node 196 and ground.

The resistor 212 is provided to sense the current flow through the switches 198, 200, 202, 204, 206, 208 and to prevent damage thereto. The resistor 212 is connected between the node 216 and ground.

The commutation module 214 is provided to generate control signals to control the energization of the phases A, B, C of the stator 66. In particular, the commutation module 214 receives either the rotational position value $\theta_M$ or the axial position Z from the position sensor 82. In response, the commutation module generates commutation signals CS1, CS2, CS3, CS4, CS5, CS6 to selectively energize the phases A, B, C. Referring to FIG. 16, commutation signals CS1, CS2, CS3, CS4, CS5, CS6 are shown for energizing the phases A, B, C pairwise to move the rotor 68 one complete revolution (i.e., 360 mechanical degrees) are shown.

Referring to FIGS. 17B and 17C, a valve operational profile 215 (illustrating a complete operational cycle of a valve 70) and a corresponding commanded valve position current $I_{CP}$ effectuating the valve cycle is shown. FIG. 17A illustrates the pressure P within a cylinder 50 as the valve 70 progresses through the valve cycle. At crankshaft angle $\theta_{CS}$=135°, the valve controller 134 commands the valve 70 to move to an open position to allow exhaust gases in the cylinder 50 to exit the cylinder 50. In particular, the valve controller 134 increases the commanded valve position current $I_{CP}$—in a positive direction—that results in the valve accelerating toward a full open position. As the valve 70 opens, the exhaust gas exits the cylinder 50 resulting in a decreasing cylinder pressure.

At crankshaft angle $\theta_{CS}$=150°, when the valve 70 is moving to the full open position, the valve controller 134 decreases the commanded position current $I_{CP}$. When the current $I_{CP}$ reverses direction as a negative or braking current, the valve 70 de-accelerates prior to reaching the full open position.

At crank shaft angle $\theta_{CS}$=160°, when the valve 70 has reached to the full open position, the controller 134 commences to decrease the negative current $I_{CP}$ until it reverses direction as a positive or holding current. Afterward, the controller 134 maintains the positive current $I_{CP}$ at an dwell current level for a desired dwell time. The holding current is necessary to counteract forces acting the valve 70 generated by the spring 78 and the cylinder gas pressure.

In response, the valve 70 is maintained at a full open position. Further, the cylinder pressure remains at a relatively constant pressure level.

At crankshaft angle $\theta_{CS}$=185°, the controller 134 commands the valve 70 to move to a closed position. In particular, the controller 134 decreases the current $I_{CP}$ until it reverses direction as a negative current. In response, the valve 70 accelerates toward a full closed position.

At crankshaft angle $\theta_{CS}$=190°, the controller 134 decreases negative current $I_{CP}$ until it reverses direction as a positive current to de-accelerate the valve 70 prior to the valve 70 reaching the full closed position. Accordingly, the de-acceleration of the valve 70 provides for soft seating of the valve 70 with the valve seat 124. Thus, engine noise may be reduced.

Referring to FIG. 2, the engine controller 188 is provided to control the operation of the engine 36. The engine controller 188 may comprise either discrete circuits or a programmable microcontroller. The controller 188 receives a crankshaft position signal $V_{CS}$ and generates the fuel injector control signal $V_{FI}$ responsive thereto. As previously discussed, the controller 188 also calculates valve operational parameters for each valve including a dwell time duration, an opening rate, a closing rate, a dwell position, and phasing information. Further, the controller 188 transmits these operational parameters to the valve controller 134 via a communication bus 192.

The crankshaft position sensor 190 generates a crankshaft position signal $V_{CS}$ indicative of the rotational position of the crankshaft 60. The sensor 190 is conventional in the art and may comprise a Hall Effect Sensor or a variable reluctance sensor. The engine controller 188 may receive the crankshaft position signal $V_{CS}$ and derive the crankshaft angle $\theta_{CS}$ responsive thereto.

Figure 19:
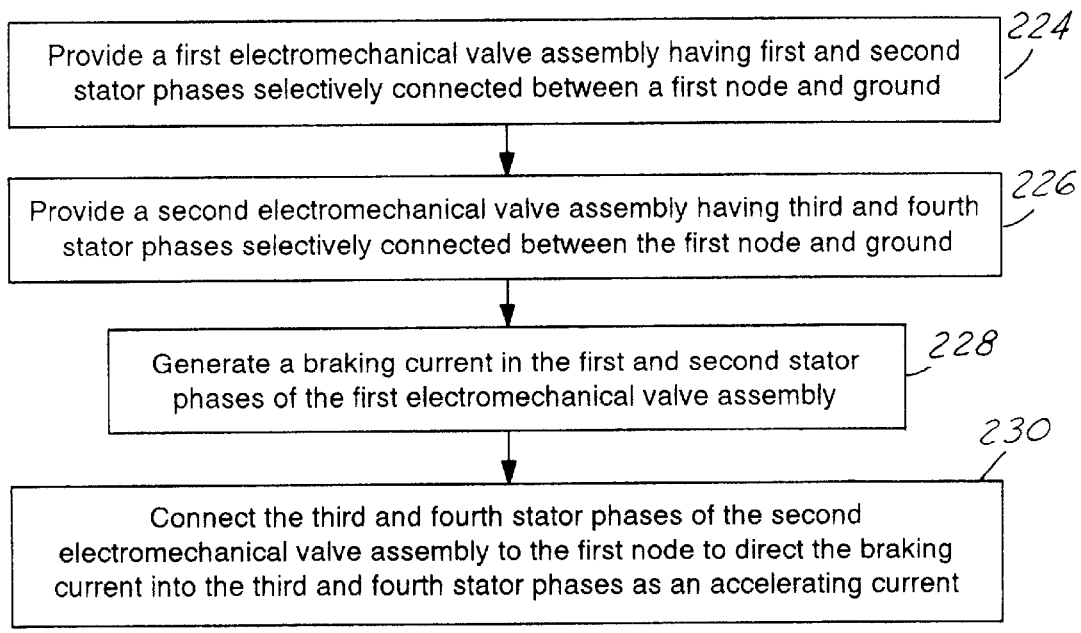
FIG. 19 is a flowchart illustrating a method for current recirculation in electromechanical valve assemblies in accordance with the present invention.

Referring to FIG. 19, a method for current recirculation (i.e., energy recover) in the electromechanical valve assemblies 46, 48 is provided. Those skilled in the art will recognize that current recirculation during operation of the intake and exhaust valve assemblies 46, 48, will result in increased engine efficiency. In particular, the method utilizes a braking current—generated when a valve is closing in the exhaust valve assembly 48—as an accelerating current to open a valve in the intake valve assembly 46. It should be understood, however, that the method could be implemented with any two valve assemblies in the engine 36 where one valve assembly is closing a valve and a second valve assembly is simultaneously opening a valve.

Referring to FIGS. 15 and 19, the method for current recirculation includes a step 224 of providing an exhaust valve assembly 48 having stator phases D and E selectively connected between a node 196 and ground. The method further includes a step 226 of providing an intake valve assembly 46 having stator phases A and B selectively connected between node 196 and ground.

The method further includes a step 228 of generating a braking current $I_{CP}$ in phases D and E of the exhaust valve assembly 48. Referring to FIGS. 18A and 18B, between crankshaft angles $\theta_0$ and $\theta_2$, the exhaust valve assembly 48 is closing a valve and is generating a braking current $I_{CP}$ (i.e., a negative current). Referring to FIG. 15, when the phases D and E of valve assembly 48 are generating a negative current $I_{CP}$ (i.e., $-I_{CP}$), the current flows through the node 196 common to all commutation circuits 194.

Finally, the method further includes a step 230 of connecting the stator phases A, B of the intake valve assembly 46 to the node 196 to direct the braking current $I_{CP}$ into stator phases A, B as an accelerating current $I_{CP}$. Referring to FIGS. 18A, 18B, and 18C, between crankshaft angles $\theta_0$ and $\theta_2$, the intake valve assembly 46 utilizes the braking current $I_{CP}$ generated by the exhaust valve assembly 48 to open the valve 70.

Referring to FIG. 2, a power distribution system 40 is provided for the engine control system 38 and the engine 36. The power distribution system 40 includes an alternator 232, a battery 234, a battery 236, and a DC/DC converter 238.

The alternator 232 is provided to maintain the state of charge in the battery 234 and the battery 236 at an adequate operational level. The alternator 232 is conventional in the art and may comprise a high power density 42 Vdc permanent-magnet enhanced water-cooled unit. Further, the alternator 232 may have a power rating of 2.5–3.5 Kilowatts to provide adequate power for the valve assemblies 46, 48 and for the remaining electrical components of the vehicle 34. The alternator 232 is driven by the crankshaft 60 and generates a current that is applied to the battery 234 and the DC/DC generator 238.

The battery 234 provides a 42 Vdc voltage to the valve controller 134 and is conventional in the art. It should be understood that the valve assemblies 46, 48 operate more efficiently utilizing a 42 Vdc voltage versus a 12 Vdc voltage. In particular, the valve controller 134 can generate a commanded valve position current $I_{CP}$ at a lower current level utilizing the 42 Vdc voltage as compared with utilizing a 12 Vdc voltage.

The battery 236 provides a 12 Vdc voltage to the engine controller 188 and is conventional in the art. The battery 236 is connected to the conventional DC/DC converter 238 which supplies a 12 Vdc charging voltage to the battery 236.

The magneto-strictive sensors 82, 170 in accordance with the present invention represent a significant improvement over conventional position sensors. In particular, the sensors 82, 170 may be disposed within a valve enclosure without increasing the height of the valve assembly 46. Accordingly, a vehicle hood (enclosing the engine) may have a decreased axial height due to the decreased height of the valve assemblies. Those skilled in the art will recognize that the decreased hood height results in increased fuel economy and visual aesthetics of an automotive vehicle.

While the invention has been particularly shown and described with reference to the preferred embodiments thereof, it is well understood by those skilled in the art that various changes and modifications can be made in the invention without departing from the spirit and the scope of the invention.

I claim:

1. A position sensor for determining a rotational position of an object rotating about a first axis, said object having a magnet rotating with said object, said sensor comprising:

a conduit extending around a portion of a circumference of said object;

a generator generating a sound wave externally of said conduit in responsive to a transmit signal, said externally generated wave propagating into an entrance in said conduit and then internally along said conduit to a localized stress boundary in said conduit, said boundary being induced by said magnet, said internally propagating sound wave being reflected in said conduit from said boundary;

a receiver receiving said reflected wave propagating externally from said conduit and generating a received signal responsive to said externally propagating wave from said conduit; and, a sensor controller configured to generate said transmit signal and to receive said received signal, said controller calculating a rotational position of said object responsive to a travel time of said wave in said conduit.

2. The position sensor of claim 1 wherein said conduit includes an arcuate shaped portion disposed proximate to an outer surface of said object.

3. The position sensor of claim 1 wherein said conduit is constructed from a nickel-iron alloy.

4. The position sensor of claim 1 wherein said generator and said receiver are both piezoelectric transducers.

5. The position sensor of claim 1 further comprising an oscillator operatively connected between said sensor controller and said generator, said oscillator generating an oscillator signal responsive to said transmit signal.

6. The position sensor of claim 1 further comprising a temperature sensor connected to said sensor controller, said temperature sensor generating a temperature signal indicative of a temperature of said conduit.

7. The position sensor of claim 1 wherein the generator and the receiver are both electro-mechanical transducers.

8. A position sensor for determining an axial position of an object moving along a first axis, wherein a magnet is disposed proximate said object and is stationary with respect to said first axis, said sensor comprising:

a conduit extending generally axially integral with said object;

a generator generating a sound wave externally of said conduit in responsive to a transmit signal, said externally generated sound wave propagating into an entrance in said conduit and then propagating internally through the conduit to a localized stress boundary in said conduit, said boundary being induced by said magnet, said internally propagating wave being reflected in said conduit from said boundary and then propagating externally from said conduit;

a receiver receiving said reflected wave propagating from said conduit and generating a received signal responsive to said wave propagating from said conduit; and, a sensor controller configured to generate said transmit signal and to receive said received signal, said controller calculating a position of said object responsive to a travel time of said wave in said conduit.

9. The position sensor of claim 8 wherein said conduit comprises an axially or wire.

10. The position sensor of claim 8 wherein said conduit is constructed from a nickel-iron alloy.

11. The position sensor of claim 8 wherein said generator and said receiver are both piezoelectric transducers.

12. The position sensor of claim 8 further comprising an oscillator operatively connected between said sensor controller and said generator, said oscillator generating an oscillator signal responsive to said transmit signal.

13. The position sensor of claim 8 further comprising a temperature sensor connected to said sensor controller, said temperature sensor generating a temperature signal indicative of a temperature of said conduit.

14. The position sensor of claim 7 wherein the generator and the receiver are both electro-mechanical transducers.

15. A method for determining a rotational position of an object rotating about a first axis, said object having a magnet rotating with said object, said method comprising the steps of:

providing a conduit extending around a portion of a circumference of said object;

generating a wave externally of said conduit into an entrance to said conduit, said wave then propagating internally said conduit to a localized stress boundary in said conduit, said localized stress boundary being induced by said magnet, said internally propagating wave being reflected in said conduit from said boundary and passing from said conduit as an external wave;

receiving said reflected wave after said reflected wave passing from the conduit as the external wave; and, calculating a rotational position of said object responsive to a travel time of said received wave.

16. The method of claim 15 wherein said step of generating a sound wave externally of said conduit includes the substeps of:

generating a transmit signal using a controller;

generating an oscillator signal responsive to said transmit signal; and, generating a vibration in said conduit responsive to said oscillator signal.

17. The method of claim 15 wherein said position of said object is further calculated responsive to a velocity of said wave in said conduit and a radius of said conduit.

18. A method for determining the axial position of an object moving along a first axis with a magnet disposed stationary with respect to said first axis, said method comprising the steps of:

providing a conduit extending generally axially integral with said object;

generating a sound wave externally of said conduit, said externally generated wave being launched into an entrance of said conduit, said introduced wave propagating internally the conduit to a localized stress boundary in said conduit, said localized stress boundary being induced by said magnet, said internally propagating wave being reflected in said conduit from said boundary and then exiting the conduit;

receiving said wave exiting the conduit; and, calculating an axial position value of said object responsive to a travel time of said received wave.

19. The method of claim 18 wherein said step of externally generating a sound wave includes the substeps of:

generating a transmit signal;

generating an oscillator signal responsive to said transmit signal; and, generating a vibration in said conduit responsive to said oscillator signal.

20. The method of claim 18 wherein said axial position of said object is further calculated responsive to a velocity of said wave in said conduit and a length of said conduit.

21. A method for determining a rotational position of a rotating object, said object having a conduit extending around a substantial portion of said object, said method comprising:

generating a sound wave externally of said conduit, said externally generated sound wave being introduced into an entrance of said conduit and then propagating as a wave internal said conduit, said internally propagating wave propagating in a first direction in said conduit;

reflecting at least a portion of said internally propagating sound wave at a location in said conduit proximate a predetermined location on said object, said reflected wave moving internally said conduit in a second direction opposite said first direction in said conduit, said reflected wave passing from the conduit as an wave external to said conduit; and calculating a rotational position of said object based on a parameter of said wave external to said conduit.

22. The method of claim 21 wherein said parameter of said wave is a travel time of said wave in said conduit.

23. The method recited in claim 21 wherein the reflected wave passing from the conduit as an wave external to said conduit is a mechanical vibration, and wherein such mechanical vibration is converted into corresponding electrical signal.

24. The method recited in claim 21 wherein the sound wave generation comprises converting electrical signal into a mechanical vibration, such vibration being the externally generated sound wave, such vibration being introduced into the conduit.

25. The method recited in claim 22 wherein the reflected wave passing from the conduit as an wave external to said conduit is a mechanical vibration, and wherein such mechanical vibration is converted into corresponding electrical signal.

26. The method recited in claim 23 wherein the externally generated sound wave is introduced in an end of the conduit and wherein the reflected wave passes externally from the conduit from said end of the conduit.

* * * * *